Figure 1:
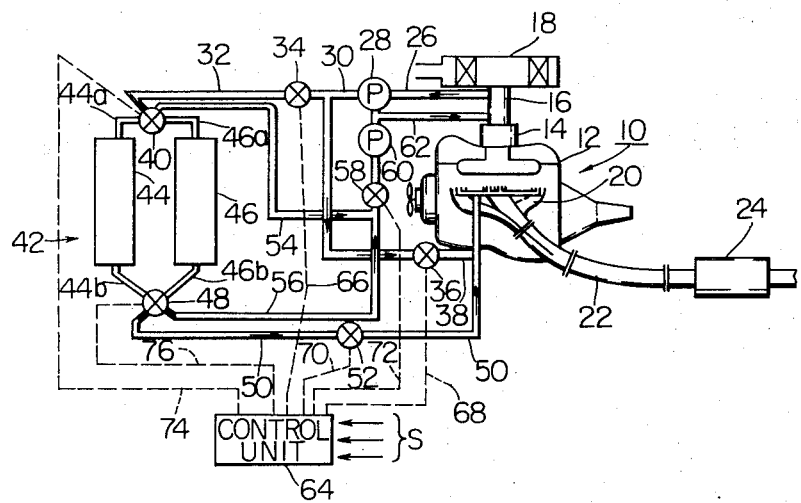

United States Patent [19]
Nishiguchi

[11] 3,828,552
[45] Aug. 13, 1974

[54] SYSTEM FOR REDUCING TOXIC COMPOUNDS IN EXHAUST GASES FROM INTERNAL COMBUSTION ENGINES

[75] Inventor: Kouichi Nishiguchi, Yokosuka, Japan

[73] Assignee: Nissan Motor Company, Limited, Yokohama City, Japan

[22] Filed: Nov. 8, 1972

[21] Appl. No.: 304,679

[30] Foreign Application Priority Data
Dec. 10, 1971 Japan............................. 46-100557

[52] U.S. Cl.................. 60/304, 60/282, 123/119 E
[51] Int. Cl........................................... F02b 75/10
[58] Field of Search............ 23/277 C; 60/274, 282, 60/304, 275, 317; 123/119 E

[56] References Cited
UNITED STATES PATENTS
3,311,097  3/1967  Mittelstaedt........................ 60/275
3,460,901  8/1969  Massa.................................. 60/274
3,602,202  8/1971  Kobayashi......................... 123/119 E

*Primary Examiner*—Douglas Hart

[57] ABSTRACT

A system for reducing toxic compounds in exhaust gases emitted from a gasoline powered internal combustion engine, which system includes an air-denitrogenating unit which is adapted to separate nitrogen molecules from the atmospheric air. The nitrogen molecules separated by the air-denitrogenating unit is introduced into an air induction passage of the engine so as to enrich an air-fuel mixture to be supplied into the engine for thereby reducing the concentration of nitrogen oxides in the engine exhaust gases. The denitrogenated air containing a large proportion of oxygen therein is supplied into an exhaust manifold of the engine as secondary air for effecting oxidizing reactions of unburned hydrocarbons and carbon monoxide in the engine exhaust gases.

5 Claims, 2 Drawing Figures

PATENTED AUG 13 1974 3,828,552

SYSTEM FOR REDUCING TOXIC COMPOUNDS IN EXHAUST GASES FROM INTERNAL COMBUSTION ENGINES

This invention relates in general to air-pollution preventive systems for gasoline powered internal combustion engines and, more particularly, to a system for reducing noxious and harmful compounds contained in exhaust gases emitted from the engines.

In the operation of gasoline powered internal combustion engines, a large quantity of noxious and harmful compounds is contained in exhaust gases emitted from the engines. These toxic compounds usually include nitrogen oxides and unburned or partially burned hydrocarbons and carbon monoxide, causing serious air pollution especially in urban areas. The hydrocarbons and carbon monoxide tend to be produced as a result of incomplete combustion of the air-fuel mixture in the engines while the nitrogen oxides tend to be produced when the engines are operating at a relatively high temperature. If arrangements are made so that the air-fuel mixture will be burned completely before the engine exhaust gases are discharged, the concentration of the nitrogen oxides in the engine exhaust gases increases by reason of enhanced chemical reaction between oxygen and nitrogen. If, on the contrary, it is desired that the concentration of the nitrogen oxides be reduced satisfactorily, the combustion of the air-fuel mixture in the engine is liable to become incomplete and, therefore, increased amounts of hydrocarbons and carbon monoxide are produced.

It is known that nitrogen oxides are produced in a large quantity especially when the engines are operating at high temperatures and, for this reason, the concentration of nitrogen oxides could be reduced if the engines would operate at reduced temperatures. Attempts have heretofore been made to supply the engine with an enriched air-fuel mixture. The enriched air-fuel mixture has a low percentage of air and oxygen contained in that air is mainly consumed for combustion at the mixture in the engine resulting in low concentration of nitrogen oxides in the engine exhaust gases. In this instance, moreover, the rate of flame propagation in the engine is made slow and the engine operates at reduced temperatures. This results in increase in the fuel consumption rates of the engines and, moreover, unburned or partially burned hydrocarbons and carbon monoxide are produced in large quantity because of excessive amount of fuel in the air-fuel mixture. To eliminate the concentration of the unburned or partially burned hydrocarbons and carbon monoxide in the engine exhaust gases, it has heretofore been proposed to introduce secondary air into the exhaust system of the engine. If, in this instance, a large amount of secondary air is introduced into the exhaust system of the engine, the exhaust gases are caused to be diluted while the temperature of the exhaust gases are decreased and, consequently, the oxidizing reaction of the unburned compounds in the exhaust gases is adversely affected.

It is, therefore, an object of the present invention to provide a system for minimizing the concentration of nitrogen oxides in exhaust gases emitted from a gasoline powered internal combustion engine while simultaneously reducing the concentration of unburned or partially burned hydrocarbons and carbon monoxide in the engine exhaust gases in a simplified manner.

Another object of the present invention is to provide a system for reducing the concentration of the toxic compounds in exhaust gases from a gasoline powered internal combustion engine without impairing the combustion efficiency of the engine.

A further object of the present invention is to provide a system for use in a gasoline powered internal combustion engine adapted to supply the engine with an enriched air-fuel mixture for reducing the concentration of nitrogen oxides in the engine exhaust gases while simultaneously supplying the exhaust system of the engine with secondary air mostly containing oxygen gases to effect oxidizing reactions of unburned or partially burned hydrocarbons and carbon monoxide in the engine exhaust gases.

Figure 2:
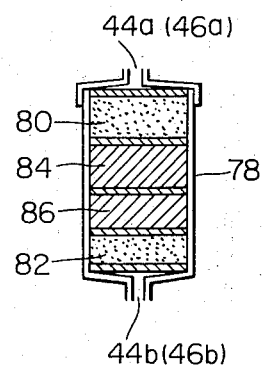

These and other features and advantages of the present invention will become more apparent from the following description when taken in conjunction with the accompanying drawings in which:

FIG. 1 is a schematic view of a preferred embodiment of the system according to the present invention, the system being shown as applied to a gasoline powered internal combustion engine of a motor vehicle; and FIG. 2 is a longitudinal sectional view showing a preferred form of nitrogen separating means forming part of the system shown in FIG. 1.

Referring now to FIG. 1, there is schematically shown the system according to the present invention, the system being shown as combined with a gasoline powered internal combustion engine of a motor vehicle. The engine, which is generally designated by reference numeral 10, has, as customary, an intake manifold 12 a carburetor 14 which is connected to the intake manifold 12 and which supplies an air-fuel mixture through the intake manifold 12 into the engine, an air induction passage 16 leading from an air cleaner 18 and connected to the carburetor 14 for passing air thereinto which is mixed with fuel to provide an air-fuel mixture, and an exhaust manifold 20 through which exhausts gases from the engine are discharged into the atmosphere via an exhaust pipe 22 and a catalytic converter 24 forming part of the exhaust system of the engine 10.

The system according to the present invention comprises a first branch conduit 26 which is branched off from the air induction passage 16 of the engine 10 and which is connected to a suction side of a first suction pump 28 having its discharge side connected to a T-shaped conduit 30. The T-shaped conduit 30 is connected at its one end to a conduit 32 via first two-way flow shut-off valve 34. The T-shaped conduit 30 is also connected at its other end through a second two-way flow shut-off valve 36 to an additional air supply conduit 38 connected to the exhaust manifold 20 of the engine 10 for supplying additional air thereinto. The conduit 32 is connected via a first four-way flow shut-off valve 40 to an air denitrogenating unit 42.

The air denitrogenating unit 42 includes two separate nitrogen separating means 44 and 46 which are arranged to alternately operate for separating nitrogen molecules from the air. The nitrogen separating means 44 and 46 have inlets 44a and 46a communicating with the discharge side of the first suction pump 28 via the four-way flow shut off valve 40, the conduit 32, the first two-way flow shut-off valve 34 and the T-shaped conduit 30. The nitrogen separating means 44 and 46 also have outlets 44b and 46b, respectively, which communicate through a second four-way flow shut off valve 48 with a denitrogenated air supply conduit 50 in which a third two-way flow shut off valve 52 is disposed. The denitrogenated air supply conduit 50 is connected to the exhaust manifold 20 of the engine 10 for supplying denitrogenated air containing oxygen gas in a large proportion thereinto to facilitate the oxidizing reactions of the unburned or partially burned compounds in the engine exhaust gases. It is to be noted that the air denitrogenating unit 42 is herein shown as comprising two nitrogen separating means, but the air denitrogenating unit 42 may comprise more than two nitrogen separating means which are alternately operated. The system according to the present invention also comprises first and second nitrogen separating conduits 54 and 56 which are respectively connected to the inlets 44a and 46a and the outlets 44b and 46b of the first and second nitrogen separating means 44 and 46 via the first and second four-way flow shut-off valves 40 and 48, respectively. The first and second nitrogen discharge conduits 54 and 56 are connected to each other and communicate via a fourth two-way flow shut-off valve 58 with a suction side of a second suction pump 60 having its discharge side connected to a second branch conduit 62 which is branched off from the air induction passage 16 of the engine 10 at a point downstream of the first branch conduit 26. The second branch conduit 62 serves to supply nitrogen rich gas into the air induction passage 16 of the engine so that the air-fuel mixture supplied to the engine will be enriched without the supply of excessive amounts of fuel.

The two-way flow shut-off valves 34, 36, 52 and 58 and the four-way flow shut off valves 40 and 48 are preferably solenoid actuated valves and are electrically connected to a control unit 64 through electric lines 66, 68, 70, 72, 74 and 76, respectively. The control unit 64 may be constructed and arranged in any desired manner depending upon the practical operation requirements of the system according to the present invention, responsive to the varying operating conditions of the engine 10 so as to control the individual shut-off valves in accordance with the sensed operating conditions of the engine.

FIG. 2 illustrates a preferred example of the nitrogen separating means shown in FIG. 1. The nitrogen separating means includes a casing 78 in which four different layers are disposed including first and second dehumidifying layers 80 and 82 located adjacent the inlet 44a or 46a and the outlet 44b or 46b, respectively, a carbon dioxide absorbent layer 84 located adjacent the first dehumidifying layer 80, and a nitrogen absorbent layer 86 interposed between the carbon dioxide absorbent layer 84 and the second dehumidifying layer 82. The first dehumidifying layer 80 is preferably made of hygroscopic materials of silica gel and serves to remove moisture from the air admitted into the inlet 44a or 46a. Likewise, the second dehumidifying layer 82 is made of hygroscopic materials of silica gel and serves to remove moisture from the air in the outlets 44b or 46b and to prevent the moisture from being passed to the nitrogen absorbent layer 86 when the engine is held in its inoperative condition. The carbon dioxide absorbent layer 84 may comprise a zeolite of formed materials and is adapted to remove carbon dioxide from the air passed through the first dehumidifying layer 80. The nitrogen absorbent layer 86 may comprise a nitrogen impermeable membrane and a molecular sieve capable of absorbing nitrogen molecules from the air. Typical of the molecular sieve used as the nitrogen absorbent are zeolites which are silicates processed from artificial or naturally occurring zeolites as starting material; the artificial or naturally occurring zeolites are first mechanically pulverized and then subjected to certain chemical treatments. Since the moisture and the carbon dioxide contained in the air deteriorate the nitrogen separating ability of the nitrogen absorbent layer 86, it is desired that the individual layers be laminated in a manner as previously described.

With this arrangement, the air under pressure delivered from the first suction pump 28 is passed into the inlet 44a or 46a, through which the air is passed into the casing 78. In this instance, the air is cleared of moisture and carbon dioxide by the first dehumidifying layer 80 and the carbon dioxide absorbent layer 84, respectively, and passed through the nitrogen absorbent layer 86 by which nitrogen molecules of the air are absorbed. The resultant denitrogenated air is passed through the outlet 44b or 46b to the denitrogenated air supply conduit 50, through which the denitrogenated air containing oxygen gas therein in large proportion is introduced into the exhaust manifold 20 of the engine 10 to effect oxidizing reactions of the unburned compounds in the engine exhaust gases. The nitrogen molecules deposited on the nitrogen absorbent layer 86 are separated by the suction of the second suction pump 60. The nitrogen molecules thus separated from the nitrogen separating means are then passed through the first and second four-way flow shut-off valves 40 and 48 into the nitrogen discharge conduits 54 and 56. The nitrogen molecules passed into the nitrogen discharge conduits 54 and 56 are then directed through the second two-way flow shut-off valve 58 and the second suction pump 60 into the second branch conduit 62, through which the nitrogen molecules are fed into the air induction passage 16 of the engine and mixed with fuel in the carburetor 12 to provide an enriched air-fuel mixture. At the same time, the moisture and carbon dioxide deposited on the first dehumidifying layer and the carbon dioxide absorbent layer in the nitrogen separating means are sucked in and discharged into the nitrogen discharge conduits 54 and 56 by the action of the second suction pump 60. Thus, the nitrogen separating means are purged by the suction pump 60 so that the nitrogen separating means are cleaned to have a sufficient nitrogen separating capacity.

As previously noted, the flow shut-off valves 34, 40, 48, 52 and 58 are operated by the control unit 64 in accordance with electric signals S representing various operating conditions of the engine 10 such as engine speed, intake manifold vacuum and engine coolant temperature. An example of operating conditions of the flow shut-off valves is shown in the following Table:

| Operating conditions of engine 10 | Flow Shut-off valve 34 | Flow Shut-off valve 40 | Flow Shut-off valve 48 | Flow Shut-off valve 52 | Flow Shut-off valve 58 |
| --- | --- | --- | --- | --- | --- |
| Inoperative | − | A (B) | A'(B') | − | − |
| Starting | + | A (B) | A'(B') | + | − |
| Deceleration (Idling) | + | A (B) | A'(B') | + | − |

Table — Continued

| Operating conditions of engine 10 | Flow Shut-off valve 34 | Flow Shut-off valve 40 | Flow Shut-off valve 48 | Flow Shut-off valve 52 | Flow Shut-off valve 58 |
|---|---|---|---|---|---|
| Normal operation | + | A (B) | A'(B') | + | + |

In the above Table, the sign "+" denotes a condition in which the two-way flow shut-off valves are opened and the sign "—" denotes a condition in which the flow shut-off valves are closed. The character "A" represents a condition in which the first four-way flow shut-off valve is operated so as to provide communication between the conduit 32 and the inlet 44a of the nitrogen separating means 44 and communication between the conduit 54 and the inlet 46a of the nitrogen separating means 46. The character "B" represents a condition in which the first four-way flow shut-off valve 40 is operated so as to provide communication between the conduit 32 and the inlet 46a and communication between the conduit 54 and the inlet 44a. The character "A'" indicates a condition in which the second four-way flow shut-off valve 48 is operated so as to provide communication between the conduit 50 and the outlet 44b of the nitrogen separating means 44 and communication between the conduit 56 and the outlet 46b of the nitrogen separating means 46. A character "B'" indicates a condition in which the second four-way flow shut-off valve is operated so as to provide communication between the conduit 56 and the outlet 44b of the nitrogen separating means 44 and communication between the conduit 50 and the outlet 46b of the nitrogen separating means 46. Moreover, the characters "A" and "A'" are intended to mean that the nitrogen separating means 44 is held in its operative condition while the characters "B" and "B'" are intended to mean that the nitrogen separating means 46 is held in its operative condition.

Before entering into detailed description of the operation of the system according to the present invention, let it be assumed that the nitrogen separating means 44 is maintained in its operative condition while the nitrogen separating means 46 is held in its inoperative condition. If, in this instance, the engine 10 is operating while the first and second suction pumps 28 and 60 are operative, atmospheric air is delivered through the branch conduit 26 into the conduit 30 by the action of the first suction pump 28 and passed through the first two-way flow shut-off valve 34 into the conduit 32. Since, in this condition, the first four-way flow shut-off valve 40 is operated so as to provide communication between the conduit 32 and the inlet 44a of the nitrogen separating means 44, the atmospheric air passed into the conduit 32 is fed into the nitrogen separating means 44 of the air denitrogenating unit 42. Consequently, the air under pressure thus fed to the nitrogen separating means 44 is cleared of its nitrogen molecules and the denitrogenated air which includes a large proportion of oxygen gas is delivered to the outlet 44b of the nitrogen separating means 44. Since, in this instance, the second four-way flow shut-off valve 48 is operated so as to provide communication between the outlet 44b and the denitrogenated air supply conduit 50, the denitrogenated air is passed into the denitrogenated air supply conduit 50 from which the denitrogenated air containing oxygen gas in a large proportion is introduced via the third two-way flow shut-off valve 52 into the exhaust manifold 20 of the engine to effect oxidizing reactions of the unburned hydrocarbons and carbon monoxide in the engine exhaust gases. If it is desired that additional air be supplied into the exhaust manifold 20 of the engine 10, then the second two-way flow shut-off valve 36 is opened so that the atmospheric air sucked in by the first suction pump 28 is permitted to flow into the conduit 38 through which the atmospheric air is introduced into the exhaust manifold 20 of the engine as additional air.

Since, on the other hand, the first and second four-way flow shut-off valves 40 and 48 are operated so as to provide communication between the inlet 46a of the nitrogen separating means 46 and the conduit 54 and communication between the outlet 46b of the nitrogen separating means 46 and the conduit 56, respectively, while the fourth two-way flow shut-off valve 58 is opened, the nitrogen molecules which have been deposited on and accumulated in the nitrogen separating means 46 are, together with the moisture and carbon dioxide, sucked in and forced out of the nitrogen separating means 46 by the action of the second suction pump 60 via the nitrogen discharge conduits 54 and 56 with the fourth two-way flow shut-off valve 58 in an open condition. The nitrogen molecules thus separated from the nitrogen separating means 46 are introduced through the second branch conduit 62 into the air induction passage 16 and, accordingly, the concentration of oxygen in the air mixed with fuel is decreased so that the air-fuel mixture supplied to the engine 10 is substantially enriched whereby the concentration of nitrogen oxides in the engine exhaust gases is significantly reduced. Preferably, the amount of nitrogen introduced into the air induction passage 16 is determined to have a value sufficient for providing an enriched air-fuel mixture to reduce the concentration of nitrogen oxides in the engine exhaust gases.

During idling or deceleration of the engine, a negligibly small amount of nitrogen oxides is produced and, therefore, the fourth two-way flow shut-off valve 58 is closed for these engine operations by the control unit 64 to prevent nitrogen from being supplied into the air-induction passage 16 of the engine.

When starting the engine, the nitrogen oxides contained in the engine exhaust gases are small in amount and the catalytic converter 24 is operating at a relatively low temperature so that the oxidizing reactions of the unburned compounds in the engine exhaust gases are insufficient. Under these circumstances, the fourth two-way flow shut-off valve 58 is closed by the control unit 64 to prevent the supply of nitrogen into the air induction passage 16 of the engine for thereby causing the carburetor 12 to provide a normal air-fuel mixture to reduce the concentration o of unburned hydrocarbons and carbon monoxide in the engine exhaust gases. If the operating temperature of the catalytic converter 24 increases to a certain level effective for oxidizing the unburned hydrocarbons and carbon monoxide in the engine exhaust gases, then the fourth two-way flow shut-off valve 58 is opened to supply nitrogen through the second branch conduit 62 into the air induction passage 16 for thereby causing the carburetor 14 to produce a substantially enriched air-fuel mixture. This enriched air-fuel mixture is supplied into the engine 10 so that only a small amount of nitrogen oxides is produced in the engine.

When the engine 10 is not operating, the flow shut-off valves 34, 52 and 58 are closed by the control unit 64 and, therefore, the individual absorbent layers in the nitrogen separating means are sealed off from the moisture in the air so that deterioration of nitrogen separating abilities of the nitrogen separating means 44 and 46 is prevented.

While, in the embodiment of FIG. 1, the system according to the present invention is shown to have two nitrogen separating means 44 and 46 by way of example only, the system may have more than two nitrogen separating means whereby the concentrations of nitrogen and oxygen are obtained at more uniform rates.

It will now be understood from the foregoing description that the system according to the present invention is useful in minimizing the concentration of nitrogen oxides in the engine exhaust gases and, at the same time, reducing the amounts of other toxic compounds such as unburned or partially burned hydrocarbons and carbon monoxide with use of a simplified construction.

It will also be appreciated that the nitrogen oxides in the engine exhaust gases are reduced by the system according to the present invention through the use of separate or independent devices for recirculating the engine exhaust gases into the engine which devices are expensive to manufacture and difficult to install on the existing engines of the motor vehicles.

It will further be noted that the system implementing the present invention is arranged to enrich the air-fuel mixture by supplying nitrogen in the atmospheric air to be mixed with fuel whereby the fuel consumption is significantly reduced.

It will also be understood that the system according to the present invention is simple in construction and can readily be installed on the existing engines of the motor vehicles.

What is claimed is:

1. A system for reducing toxic compounds in exhaust gases emitted from a gasoline powered internal combustion engine having an air induction passage and an exhaust manifold, comprising a first branch conduit branched off from said air induction passage, a first suction pump connected to said first branch conduit for sucking in atmospheric air from said air induction passage, and air denitrogenating unit connected to said first branch conduit through said suction pump for denitrogenating air supplied through said branch conduit, a second suction pump connected to said air-denitrogenating unit for separating nitrogen molecules deposited in said air-denitrogenating unit, a second branch conduit branched off from said air induction passage at a point downstream of said first branch conduit and connected to said second suction pump for delivering nitrogen separated from said air-denitrogenating unit into said air induction passage, and a denitrogenated air supply conduit connected to said air-denitrogenating unit and to said exhaust manifold of said engine for supplying denitrogenated air containing a large portion of oxygen into said exhaust manifold of said engine.

2. A system as claimed in claim 1, wherein said air-denitrogenating unit includes at least two nitrogen separating means which are alternately operable for denitrogenating air supplied through said first branch conduit.

3. A system for reducing toxic compounds in exhaust gases emitted from a gasoline powered internal combustion engine having an air induction passage and an exhaust manifold, comprising a first branch conduit branched off from said air induction passage, a first suction pump connected to said first branch conduit for sucking in atmospheric air from said air induction passage, a first four-way flow shut-off valve connected to said first suction pump, an air-denitrogenating unit including at least two nitrogen separating means which are alternately operable for denitrogenating air supplied from said first suction pump, said nitrogen separating means having inlets respectively which are connected through said first four-way flow shut-off valve to said first suction pump and having outlets respectively, a second four-way flow shut-off valve connected to the outlets of said nitrogen separating means, first and second nitrogen discharge conduits connected to said first and second four-way flow shut-off valves, a second suction pump connected to said first and second nitrogen discharge conduits and selectively communicating with one of said nitrogen separating means through said first and second four-way flow shut-off valves for separating nitrogen molecules deposited in said one of said nitrogen separating means, a second branch conduit branched off from said air induction passage of said engine at a point downstream of said first branch conduit and connected to said second suction pump for supplying nitrogen separated from said one of said nitrogen separating means into said air induction passage, and a denitrogenated air supply conduit connected between said second four-way flow shut-off valve and said exhaust manifold of said engine and selectively communicating with another one of said nitrogen separating means through said second four-way flow shut-off valve for directing denitrogenated air containing a large proportion of oxygen into said exhaust manifold of said engine.

4. A system as claimed in claim 3, further comprising an additional air supply conduit connected to said first suction pump and communicating with said exhaust manifold of said engine for supplying additional air thereinto.

5. A system as claimed in claim 3, wherein each of said nitrogen separating means includes first and second dehumidifying layers located adjacent the inlet and outlet respectively, a carbon dioxide absorbent layer located adjacent said first dehumidifying layer, and a nitrogen absorbent layer located between said carbon dioxide absorbent layer and said second dehumidifying layer.

* * * * *